US012749751B2

(12) United States Patent
Yao et al.

(10) Patent No.: US 12,749,751 B2
(45) Date of Patent: Sep. 29, 2026

(54) LAYOUT FOR BATTERY PACK WITH MIXED CHEMISTRY CELLS

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Zhenwen Hu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 808 days.

(21) Appl. No.: 18/302,436

(22) Filed: Apr. 18, 2023

(65) Prior Publication Data

US 2024/0291085 A1 Aug. 29, 2024

(30) Foreign Application Priority Data

Feb. 28, 2023 (CN) ......................... 202310193548.1

(51) Int. Cl.
*H01M 50/209* (2021.01)
*H01M 4/36* (2006.01)

(52) U.S. Cl.
CPC ......... *H01M 50/209* (2021.01); *H01M 4/364* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 12,113,246 B2 | 10/2024 | Liang et al. | | |
| 2022/0115686 A1 | 4/2022 | Liu et al. | | |
| 2023/0066562 A1* | 3/2023 | Liang | ................. | H01M 50/358 |
| 2024/0162544 A1* | 5/2024 | Li | ....................... | H01M 50/209 |

FOREIGN PATENT DOCUMENTS

| | | | |
|---|---|---|---|
| DE | 102020109055 A1 | 10/2021 | |
| DE | 202023100580 U1 | 2/2023 | |
| WO | WO 2022104548 * | 5/2022 | |
| WO | WO-2023097490 A1 * | 6/2023 | ........ H01M 10/6556 |

OTHER PUBLICATIONS

DE Office Action for Appln No. 10 2023 107 676.0 dated Aug. 31, 2023, 7 pages.
German Office Action for German Application No. 102023107676.0; dated Feb. 18, 2026; 4 pages.

* cited by examiner

*Primary Examiner* — Basia A Ridley
*Assistant Examiner* — Heng M. Chen
(74) *Attorney, Agent, or Firm* — CANTOR COLBURN LLP

(57) ABSTRACT

Aspects of the disclosure include a layout for a battery pack having mixed chemistry cells. An exemplary battery pack can include a plurality of first battery cells of a first cell chemistry. Each one of the plurality of first battery cells can include a same first height, a same first width, and a same first length. The battery pack can further include a plurality of second battery cells of a second cell chemistry different than the first cell chemistry. The second cell chemistry can provide a lower capacity than the first cell chemistry. Each one of the plurality of second battery cells can include the same first height, the same first width, and a same second length. The second length can be greater than the first length.

20 Claims, 7 Drawing Sheets

LAYOUT FOR BATTERY PACK WITH MIXED CHEMISTRY CELLS

CROSS-REFERENCE TO RELATED APPLICATION

This application claims the benefit of Chinese Application No. 202310193548.1, filed on Feb. 28, 2023, the disclosure of which is incorporated herein by reference in its entirety.

INTRODUCTION

The subject disclosure relates to battery cell technologies, and particularly to battery pack layouts for battery packs having mixed chemistry cells.

High voltage electrical systems are increasingly used to power the onboard functions of both mobile and stationary systems. For example, in motor vehicles, the demand to increase fuel economy and reduce emissions has led to the development of advanced electric vehicles (EVs). EVs rely upon Rechargeable Energy Storage Systems (RESS), which typically include one or more high voltage battery packs, and an electric drivetrain to deliver power from the battery to the wheels. Battery packs can include any number of interconnected battery modules depending on the power needs of a given application. Each battery module includes a collection of conductively coupled electrochemical cells. The battery pack is configured to provide a Direct Current (DC) output voltage at a level suitable for powering a coupled electrical and/or mechanical load (e.g., an electric motor).

The capacity of a battery pack can be increased by increasing the number of modules and/or cells in the battery pack, and by increasing the number of parallel core-rolls, the number of electrode layers, and the electrode surface area within each cell of the battery pack. The battery cell chemistry also affects the overall capacity. The two primary battery chemistries are the nickel-cobalt-manganese (NCM) battery and the lithium-iron-phosphate (LFP) battery.

SUMMARY

In one exemplary embodiment a battery pack can include a plurality of first battery cells of a first cell chemistry. Each one of the plurality of first battery cells can include a same first height, a same first width, and a same first length. The battery pack can further include a plurality of second battery cells of a second cell chemistry different than the first cell chemistry. The second cell chemistry can provide a lower capacity than the first cell chemistry. Each one of the plurality of second battery cells can include the same first height, the same first width, and a same second length. The second length can be greater than the first length.

In addition to one or more of the features described herein, in some embodiments, each one of the plurality of first battery cells is a nickel-cobalt-manganese (NCM) cell. In some embodiments, each one of the plurality of second battery cells is a lithium-iron-phosphate (LFP) cell.

In some embodiments, a first number of first battery cells and a second number of second battery cells are selected to maximize a volume utilization of the battery pack.

In some embodiments, the plurality of first battery cells and the plurality of second battery cells are staggered in the battery pack in a brick style arrangement.

In some embodiments, at least one cell of the plurality of second battery cells is between each pair of the plurality of first battery cells.

In some embodiments, each line of the battery pack includes at least one cell of the plurality of first battery cells.

In another exemplary embodiment a vehicle includes an electric motor and a battery pack electrically coupled to the electric motor. The battery pack can include a plurality of first battery cells of a first cell chemistry. Each one of the plurality of first battery cells can include a same first height, a same first width, and a same first length. The battery pack can further include a plurality of second battery cells of a second cell chemistry different than the first cell chemistry. The second cell chemistry can provide a lower capacity than the first cell chemistry. Each one of the plurality of second battery cells can include the same first height, the same first width, and a same second length. The second length can be greater than the first length.

In yet another exemplary embodiment a method for providing a battery pack that leverages mixed chemistry cells for maximal volume utilization can include providing a plurality of first battery cells of a first cell chemistry. Each one of the plurality of first battery cells can include a same first height, a same first width, and a same first length. The method can further include providing a plurality of second battery cells of a second cell chemistry different than the first cell chemistry. The second cell chemistry can provide a lower capacity than the first cell chemistry. Each one of the plurality of second battery cells can include the same first height, the same first width, and a same second length. The second length can be greater than the first length.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
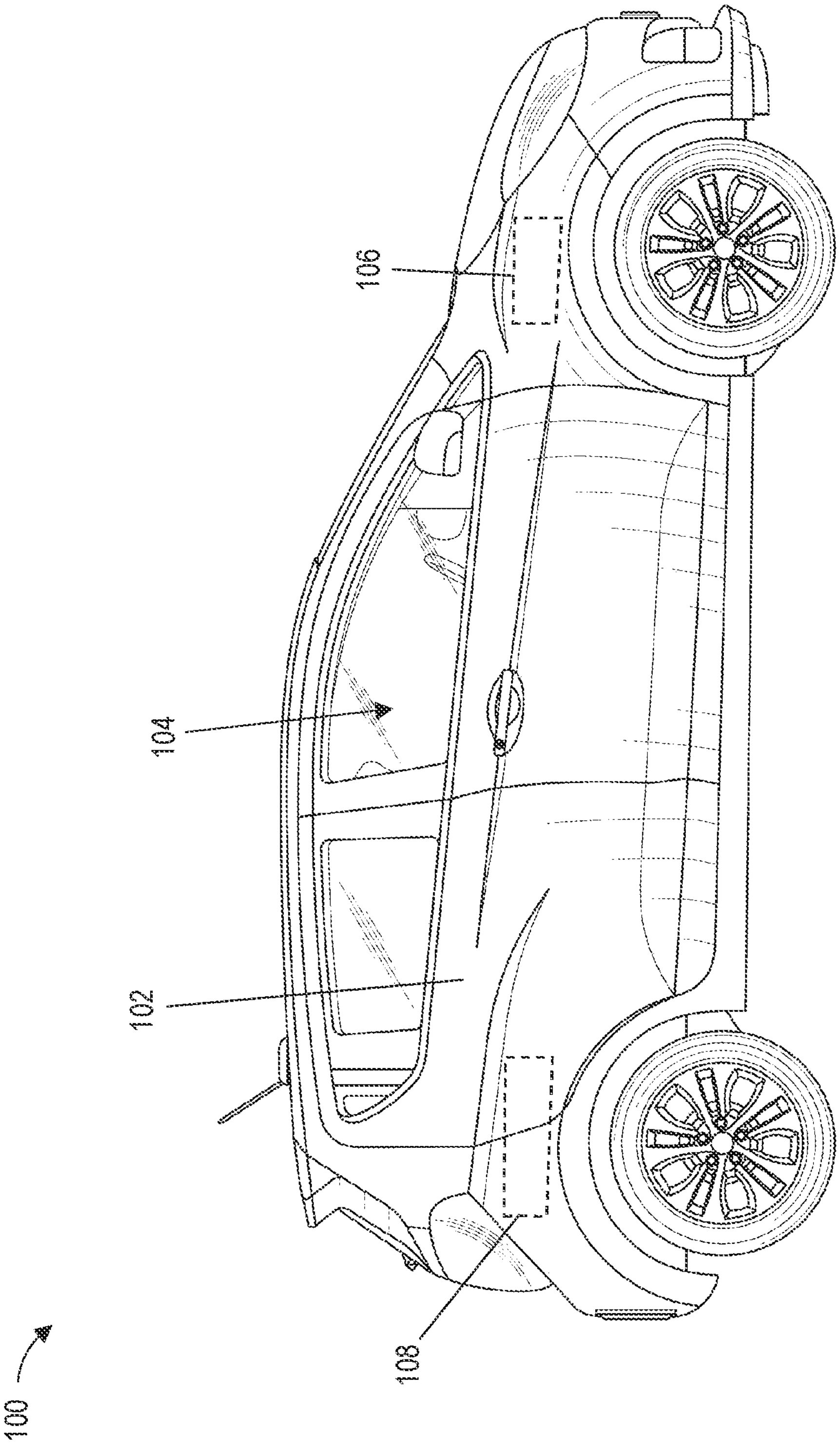
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

As will be detailed herein, the electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure. Moreover, while the present disclosure is discussed primarily in the context of a battery pack 108 configured for the electric motor 106 of the vehicle 100, aspects described herein can be similarly incorporated within any system (vehicle, building, or otherwise) having an energy storage system(s) (e.g., one or more battery packs) with mixed chemistry cells, and all such configurations and applications are within the contemplated scope of this disclosure.

As discussed previously, the most common battery chemistries are the nickel-cobalt-manganese (NCM) battery and the lithium-iron-phosphate (LFP) battery. Each offers its own advantages and disadvantages. For example, NCM cells offer roughly 5 to 20 percent higher capacity than LFP cells for the same battery cell size (e.g., same height, width, and length) and provide relatively higher accuracy state of charge (SOC) estimations. Conversely, LFP cells have a lower risk of thermal runaway than NCM cells, owing in part to the fact that heat conductivity of an LFP cell along the thickness direction (i.e., through-plane heat conductivity) is much lower than in the other directions (i.e., in-plane heat conductivity).

To reduce the risk of thermal runaway for either battery type, battery manufacturers have also developed new cell layouts, such as the brick arrangement, where successive rows of cells are shifted with respect to adjacent rows. The idea with the brick arrangement is to allow a cell experiencing a thermal event to discharge the excess heat amongst a plurality of cells, rather than to a single (next) cell, as is the case with in-line arrangements. In other words, a brick arrangement can prevent a single cell experiencing a thermal event from discharging all of the excess heat to a next cell and thereby causing the next cell to undergo a thermal event (this type of thermal event chain defines a thermal runaway). Unfortunately, the brick arrangement results in unused space (sometimes referred to as voids) along the periphery of the battery pack, natively reducing overall battery capacity and providing a lower volumetric energy density than in-line battery packs.

This disclosure introduces a new type of battery layout that leverages mixed chemistry cells to reduce thermal runaway while also maximizing volume utilization (e.g., reducing a number or size of voids) in a battery pack. In some embodiments, the mixed chemistry cells include a first cell chemistry (e.g., NCM cells) and a second cell chemistry (e.g., LFP cells). In some embodiments, cells with different chemistry are designed with two fixed dimensions and one floating dimension. For example, cells with different chemistry can be designed to have the same height and width but different length. In some embodiments, a plurality of mixed chemistry cells are arranged in a brick arrangement (also referred to as a sandwiched style) according to the different dimensions of the cells having different chemistry. In this manner, both volume utilization and heat dispersion among the cells of the battery pack can be increased.

Battery packs constructed with mixed chemistry cells in accordance with one or more embodiments offer several technical advantages over other battery pack layouts. In particular, layouts described herein can leverage the unique advantages of the various battery chemistries without sacrificing volume utilization or heat dispersion. For example, in some embodiments, the cells in a battery pack are split into a plurality of cell groups (modules, etc.), each cell group containing any number of LFP cells (depending on the needs of a particular application) and a single NCM cell. The NCM cell can be leveraged for accurate state of charge estimations for the respective cell group. In some embodiments, the NCM cell is surrounded by LFP cells to reduce the risk of a thermal runaway. In addition, embodiments described herein can optimize the number and location of battery cells of various chemistries to maximize volume utilization.

Figure 2A:
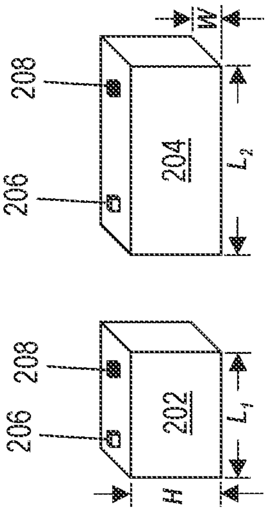
FIG. 2A is a view of a first battery cell and a second battery cell configured in accordance with one or more embodiments.

FIG. 2A illustrates a view of a first battery cell 202 and a second battery cell 204 configured in accordance with one or more embodiments. The first battery cell 202 and the second battery cell 204 can be included, for example, in a battery pack of an electric vehicle (e.g., the battery pack 108 of vehicle 100), although other energy storage applications (for vehicles, structures, or otherwise) are within the contemplated scope of this disclosure. In some embodiments, the first battery cell 202 is made of a first cell chemistry. For example, the first battery cell 202 can be an NCM cell. In some embodiments, the second battery cell 204 is made of a second cell chemistry different than the first cell chemistry. For example, the second battery cell 204 can be an LFP cell. In some embodiments, the first battery cell 202 and the second battery cell 204 each include a first terminal 206 (e.g., a positive terminal) and a second terminal 208 (e.g., a negative terminal).

In some embodiments, the first battery cell 202 and the second battery cell 204 are designed to have two shared, fixed dimensions and one floating dimension. For example, in some embodiments, the height ("H") and width ("W") of the first battery cell 202 and the second battery cell 204 are the same, while the length ("$L_1$" and "$L_2$", respectively) of the first battery cell 202 and the second battery cell 204 differ. By floating one dimension (e.g., length), cells made of cell chemistries having different energy densities can be sized such that all cells offer the same capacity. To illustrate, consider a scenario where the first battery cell 202 (e.g., an NCM cell) has a higher energy density than the second battery cell 204 (e.g., an LFP cell). To compensate, the second battery cell 204 can be made of a length "$L_2$" that is longer than a length "$L_1$" of the first battery cell 202. In other words, $L_1$ and $L_2$ can be selected such that the capacity of the first battery cell 202 and the second battery cell 204 are the same. Observe that, for NCM and LFP cells, the LFP cells will necessarily be longer to match the higher capacity density of the NCM cells. Observe further that $L_2$ can be expressed in terms of $L_1$ according to the simple proportion $L_1=\alpha L_2$, where a is a scaling factor. For example, $L_1=0.8 \cdot L_2$, etc.

Figure 2B:
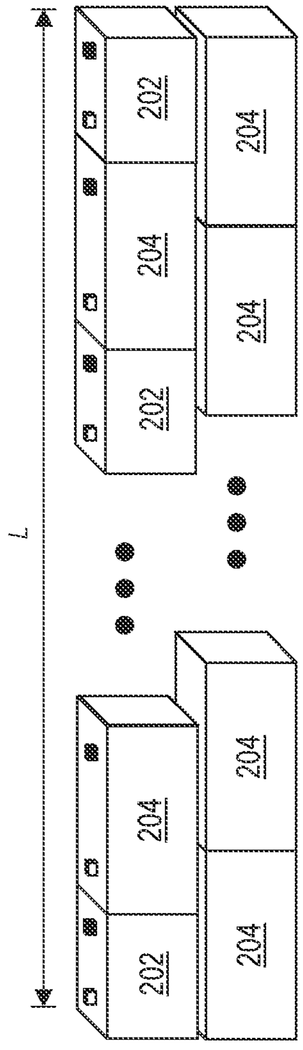
FIG. 2B is a view of a plurality of first battery cells and a plurality of second battery cells configured in accordance with one or more embodiments.

FIG. 2B illustrates a view of a plurality of first battery cells 202 and a plurality of second battery cells 204 configured in accordance with one or more embodiments. In some embodiments, a number ("x") of the plurality of first battery cells 202, a number ("y") of a plurality of second battery cells 204, and their respective dimensions (length, height, width) within the battery pack 108 can be determined from one or more initial conditions (also referred to as predetermined or user-specified design requirements) to minimize voids. For example, in some embodiments, the dimensions (total length $L_T$, height $H_T$, width $W_T$) and/or capacity requirements of the battery pack 108 are fixed (e.g., the dimensions of the battery pack 108 can be a fixed constraint).

In some embodiments, the height H of the first battery cells 202 and the second battery cells 204 is equal to the total height $H_T$ of the battery pack 108. In some embodiments, the width W of the first battery cells 202 and the second battery cells 204 can then be determined according to the following equation:

$$W_T = zW \tag{1}$$

where z denotes the total number of battery cells along the W direction in the battery pack 108. In some embodiments, z and W are chosen such that z is a whole integer (no partial cells) and $z \cdot W$ is as close to $W_T$ as possible. Ideally, $z \cdot W$ will exactly equal $W_T$, but this scenario may not be possible (e.g., battery cells may be limited to one or more predetermined widths). In this manner, voids along the W direction can be eliminated or mitigated.

The number ("x") of the plurality of first battery cells 202, the number ("y") of the plurality of second battery cells 204, and their respective lengths ($L_1$ and $L_2$) can then be determined to eliminate or mitigate voids along the L direction. The lengths $L_1$ and $L_2$ can be solved in a similar manner as the width W, except that, for length, rows of the battery cell 108 having mixed chemistry cells and rows of the battery cell 108 having only single chemistry cells are solved separately (lengths are not the same across all cell chemistries). For example, equation (2) is for rows having two different chemistry cells and equation (3) is for rows of a single cell chemistry.

$$L_T = xL_1 + yL_2 \tag{2}$$

$$L_T = zL_2 \tag{3}$$

In some embodiments, x, y, z, $L_1$, and $L_2$ are chosen such that x, y, and z are whole integers (no partial cells) and $x \cdot L_1 + y \cdot L_2$ and $z \cdot L_2$ are as close to $L_T$ as possible. Ideally, $x \cdot L_1 + y \cdot L_2$ and $z \cdot L_2$ will exactly equal $L_T$, but this scenario may not be possible (e.g., battery cells may be limited to one or more predetermined lengths). In this manner, voids along the L direction can be eliminated or mitigated.

Figure 3:
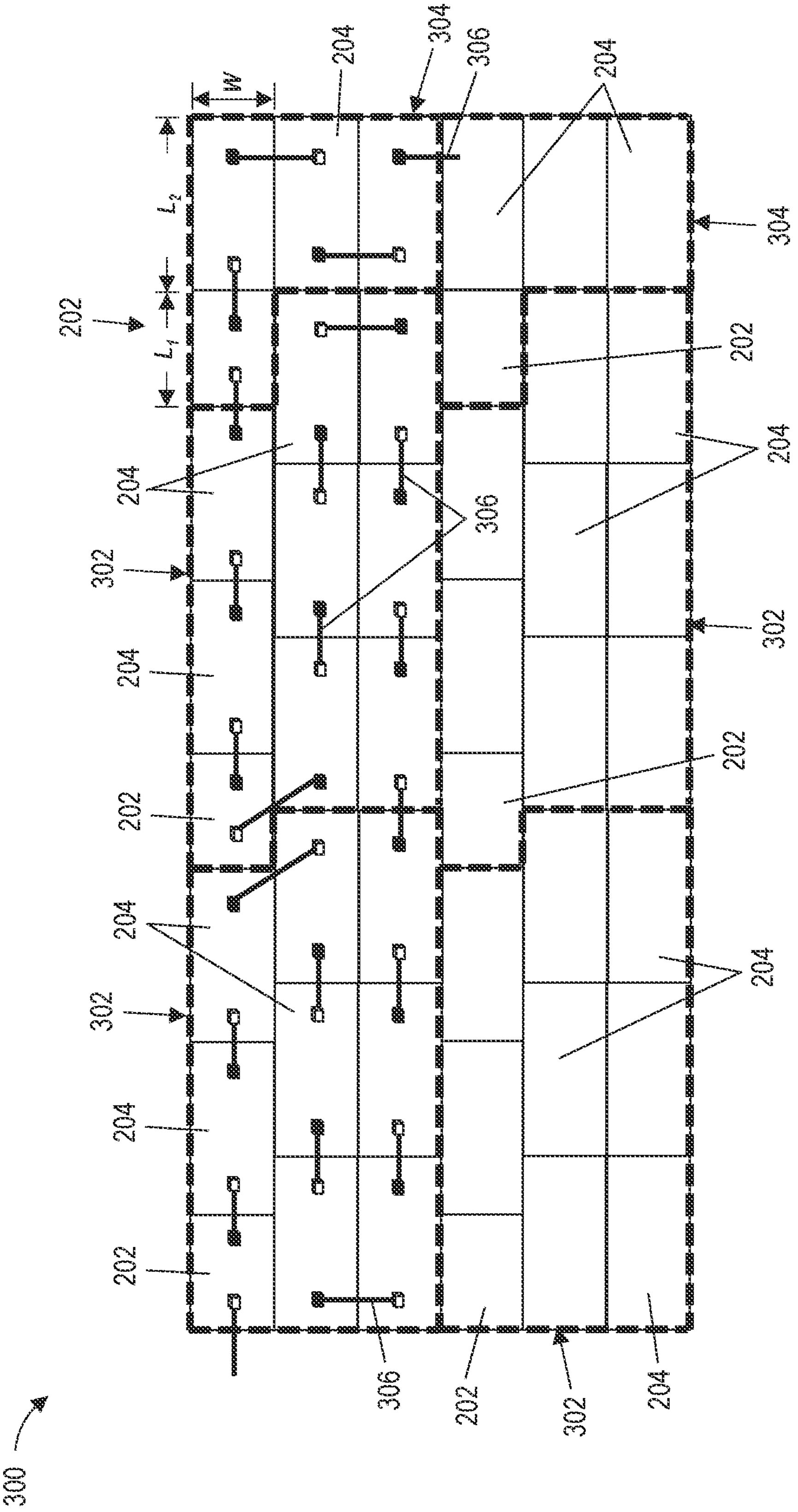
FIG. 3 illustrates a top-down view of a battery pack layout in accordance with one or more embodiments.

FIG. 3 illustrates a top-down view of a battery pack layout 300 in accordance with one or more embodiments. The battery pack layout 300 can be included within a battery pack (e.g., the battery pack 108 of FIG. 1), although other applications are within the contemplated scope of this disclosure. Moreover, while the battery pack layout 300 is shown having a particular number and arrangement of first battery cells 202 and second battery cells 204 for ease of discussion, the number and/or arrangement (configuration, ordering, etc.) of cells in the battery pack layout 300 is not meant to be particularly limited.

As shown in FIG. 3, the battery pack layout 300 can include a number of first battery cells 202 (here, 6 first battery cells 202) and a number of second battery cells 204 (here, 38 second battery cells 204). In other words, the battery pack layout 300 can include mixed chemistry cells. In some embodiments, the first battery cells 202 and the second battery cells 204 are arranged into two or more cell groups 302, 304 (here, the 4 cell groups 302 and 2 cell groups 304 indicated by dashed lines) to minimize voids (i.e., to maximize volume utilization). The number of cell groups 302, 304 is shown for example only and is not meant to be particularly limited. Similarly, the cell group 302 and the cell group 304 can have a same, or different, number and/or arrangement of the first battery cells 202 and the second battery cells 204.

In the embodiments illustrated in FIG. 3, each of the cell groups 302, 304 includes a single battery cell 202 and one or more battery cells 204. For example, in some embodiments, the cell group 302 includes one battery cell 202 and 8 battery cells 204, while the cell group 304 includes one battery cell 202 and 4 battery cells 204. In this manner, each cell group 302, 304 includes a battery cell 202 (e.g., an NCM cell) to serve as a reference for determining state of charge.

In some embodiments, each of the battery cells 202 in a cell group 302, 304 are surrounded by a number of battery cells 204 (e.g., LFP cells) to reduce the risk of thermal runaway. In some embodiments, the battery cells 202 and the battery cells 204 in adjacent rows of the battery pack layout 300 are staggered (e.g., a brick style arrangement) to further reduce the risk of thermal runaway.

As further shown in FIG. 3, each of the first battery cells 202 and each of the second battery cells 204 can be connected to adjacent cells via wiring 306. Note that only a portion of the wiring 306 is shown for clarity (as shown, wiring for 2 of the cell groups 302 and one of the cell groups 304), it should be understood, however, that wiring 306 can be similarly provided for all of the cell groups 302, 304.

In some embodiments, all of the battery cells 202, 204 within a same cell group 302, 304 are connected in serial. In some embodiments, adjacent groups of the cell groups 302 and the cell groups 304 can be connected in serial and/or parallel (as shown, serial connected).

Figure 4:
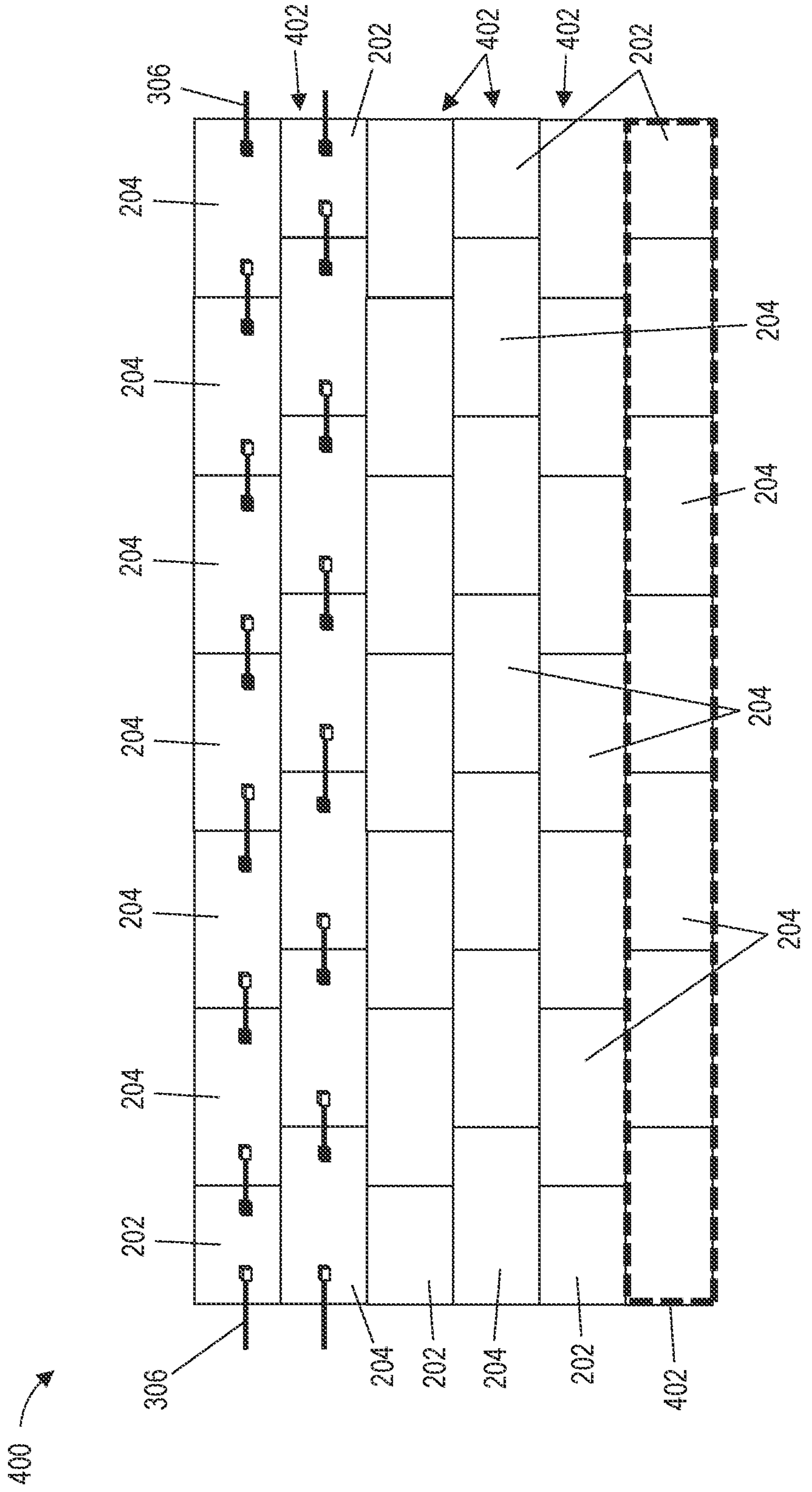
FIG. 4 illustrates a top-down view of another battery pack layout in accordance with one or more embodiments.

FIG. 4 illustrates a top-down view of a battery pack layout 400 in accordance with one or more embodiments. The battery pack layout 400 can be included within a battery pack (e.g., the battery pack 108 of FIG. 1), although other applications are within the contemplated scope of this disclosure. Moreover, while the battery pack layout 400 is shown having a particular number and arrangement of first battery cells 202 and second battery cells 204 for ease of discussion, the number and/or arrangement (configuration, ordering, etc.) of cells in the battery pack layout 400 is not meant to be particularly limited. The battery pack layout 400 illustrates a first type of layout (as compared to FIG. 5) whereby NCM cells are positioned at the ends of the battery pack layout 400 (i.e., as the first and/or last cell in each line 402 of the battery pack layout 400.

As shown in FIG. 4, each line 402 (also referred to as a row or cell group) of the battery pack layout 400 can include a same number of first battery cells 202 (here, 1 first battery cell 202) and a same number of second battery cells 204

(here, 6 second battery cells 204), although the arrangement (ordering) of the first battery cells 202 and second battery cells 204 can vary.

In some embodiments, each line 402 includes at least one and a same number of first battery cells 202. While shown having a single first battery cell 202 for ease of discussion, embodiments herein are not so limited and can include any number of first battery cells 202 so long as each line 402 includes a same number of first battery cells 202.

As further shown in FIG. 4, each of the first battery cells 202 and each of the second battery cells 204 in a same line 402 can be connected in serial via wiring 306. Note that only a portion of the wiring 306 is shown for clarity (as shown, wiring for 2 of the lines 402), it should be understood, however, that wiring 306 can be similarly provided for all of the lines 402. While not separately shown, the connection between the lines 402 can be made serially and/or in parallel.

Figure 5:
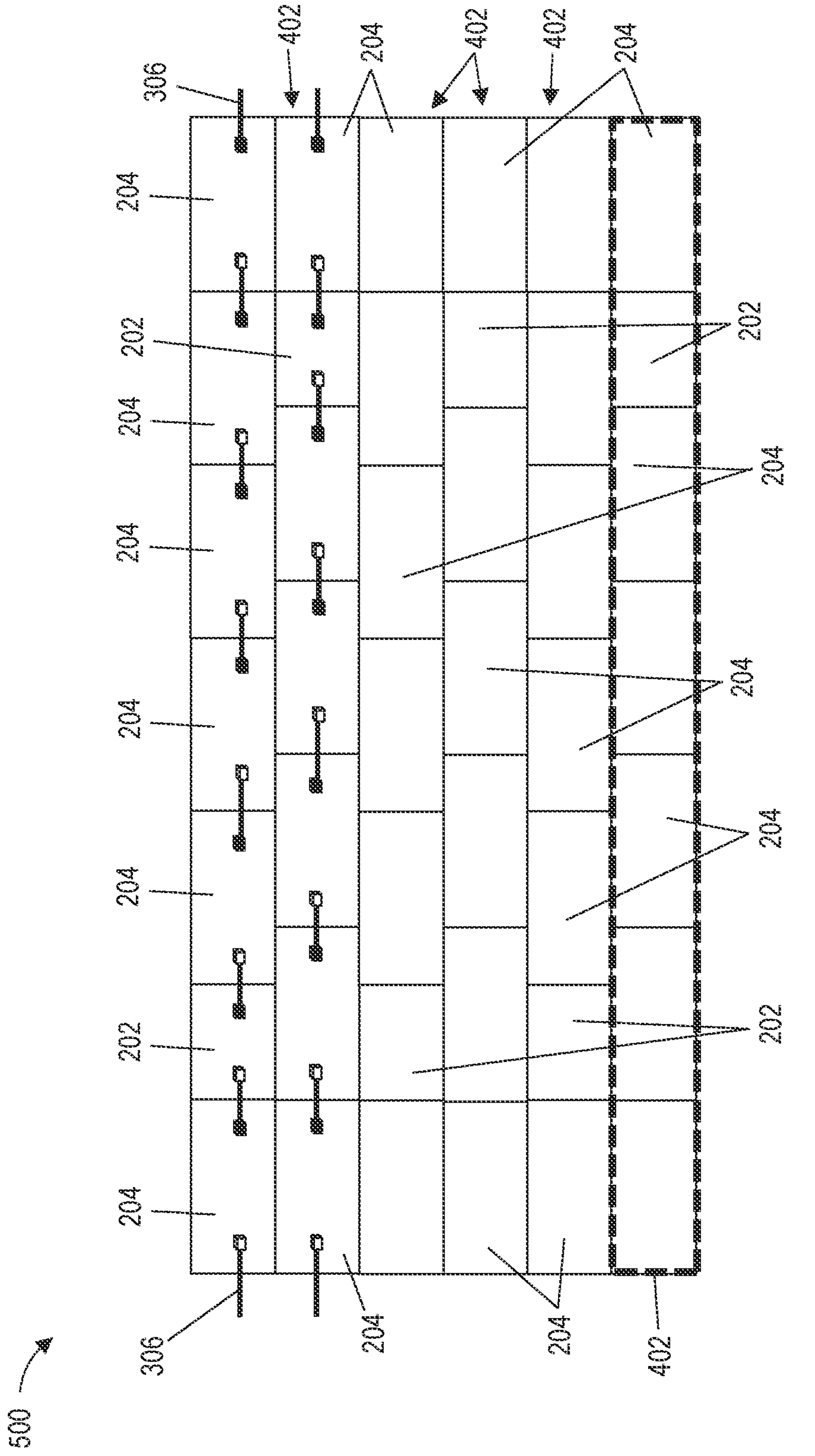
FIG. 5 illustrates a top-down view of yet another battery pack layout in accordance with one or more embodiments.

FIG. 5 illustrates a top-down view of a battery pack layout 500 in accordance with one or more embodiments. The battery pack layout 500 can be included within a battery pack (e.g., the battery pack 108 of FIG. 1), although other applications are within the contemplated scope of this disclosure. Moreover, while the battery pack layout 500 is shown having a particular number and arrangement of first battery cells 202 and second battery cells 204 for ease of discussion, the number and/or arrangement (configuration, ordering, etc.) of cells in the battery pack layout 500 is not meant to be particularly limited. The battery pack layout 500 illustrates a second type of layout (as compared to FIG. 4) whereby NCM cells are positioned between two LFP cells in each line 402 of the battery pack layout 500.

As shown in FIG. 5, each line 402 of the battery pack layout 500 can include a same number of first battery cells 202 (here, 1 first battery cell 202) and a same number of second battery cells 204 (here, 6 second battery cells 204), although the arrangement (ordering) of the first battery cells 202 and second battery cells 204 can vary.

In some embodiments, each line 402 includes at least one and a same number of first battery cells 202. While shown having a single first battery cell 202 for ease of discussion, embodiments herein are not so limited and can include any number of first battery cells 202 so long as each line 402 includes a same number of first battery cells 202.

As further shown in FIG. 5, each of the first battery cells 202 and each of the second battery cells 204 in a same line 402 can be connected in serial via wiring 306. Note that only a portion of the wiring 306 is shown for clarity (as shown, wiring for 2 of the lines 402), it should be understood, however, that wiring 306 can be similarly provided for all of the lines 402. While not separately shown, the connection between the lines 402 can be made serially and/or in parallel.

Figure 6:
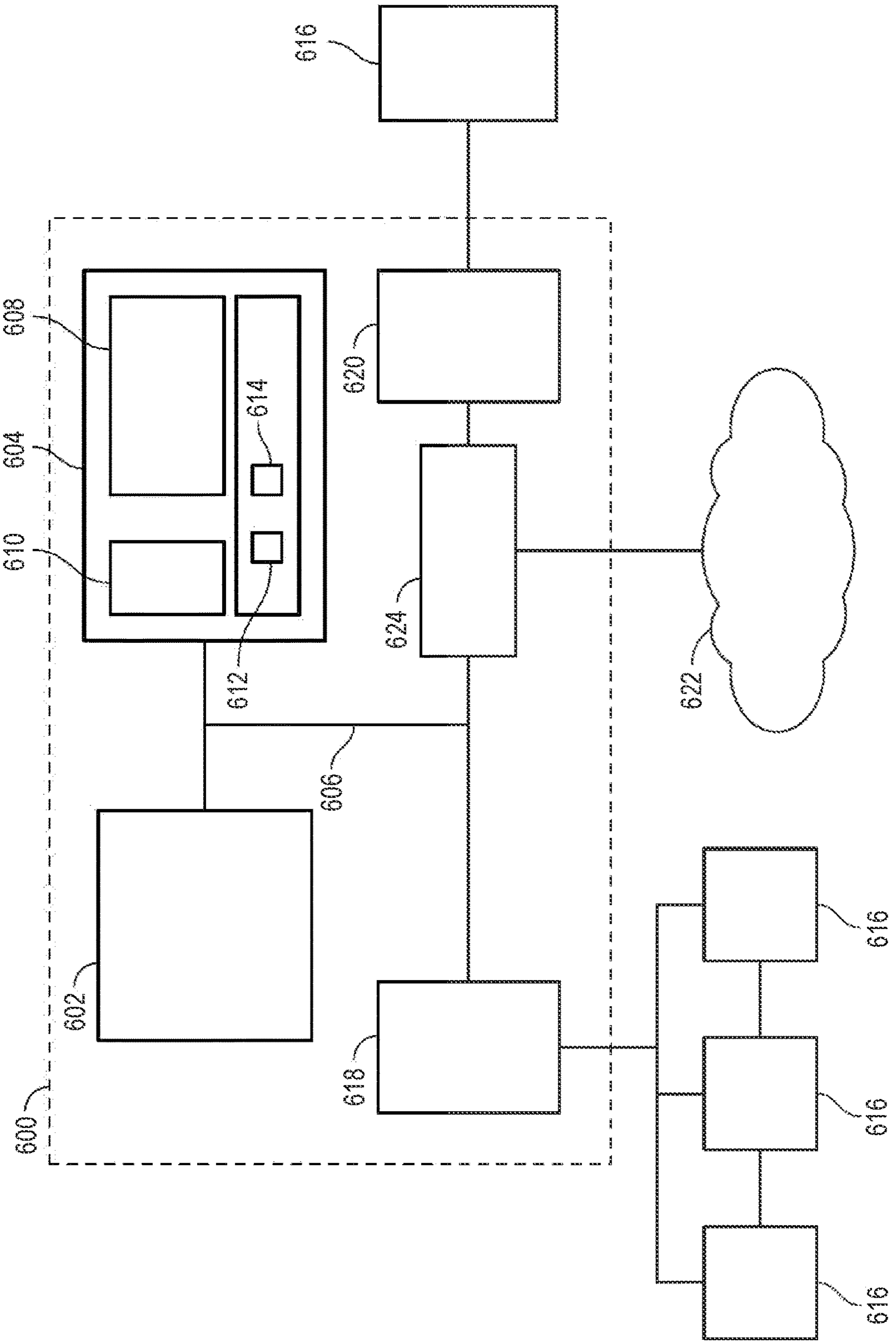
FIG. 6. is a computer system according to one or more embodiments.

FIG. 6 illustrates aspects of an embodiment of a computer system 600 that can perform various aspects of embodiments described herein. In some embodiments, the computer system 600 can be incorporated within or in combination with a battery pack (e.g., the battery pack 108 of FIG. 1). In some embodiments, the computer system 600 can be configured to receive a signal (e.g., a state of charge signal, a temperature signal, etc.) from one or more of the first battery cells 202 and/or the second battery cells 204 of the battery pack 108.

The computer system 600 includes at least one processing device 602, which generally includes one or more processors for performing a variety of functions, such as, for example, controlling power delivery of an electric motor (e.g., the electric motor 106 of FIG. 1) to one or more wheels of a vehicle (e.g., the vehicle 100), controlling charge/discharge rates of one or more batteries (e.g., the battery pack 108 of FIG. 1), and/or monitoring a status of the one or more batteries. In addition, the computer system 600 can include the logic necessary to estimate a state of charge and/or to determine a temperature for any of the first battery cells 202 and/or the second battery cells 204 and to take appropriate action based on the data (e.g., issue a low battery charge warning, issue a battery cell failure warning, issue a high cell temperature warning, disconnect one or more cells having a high temperature, etc.).

Components of the computer system 600 include the processing device 602 (such as one or more processors or processing units), a system memory 604, and a bus 606 that couples various system components including the system memory 604 to the processing device 602. The system memory 604 may include a variety of computer system readable media. Such media can be any available media that is accessible by the processing device 602, and includes both volatile and non-volatile media, and removable and non-removable media.

For example, the system memory 604 includes a non-volatile memory 608 such as a hard drive, and may also include a volatile memory 610, such as random access memory (RAM) and/or cache memory. The computer system 600 can further include other removable/non-removable, volatile/non-volatile computer system storage media.

The system memory 604 can include at least one program product having a set (e.g., at least one) of program modules that are configured to carry out functions of the embodiments described herein. For example, the system memory 604 stores various program modules that generally carry out the functions and/or methodologies of embodiments described herein. A module or modules 612, 614 may be included to perform functions related to monitoring and/or control of the battery pack 108, such as, for example, determining one or more current cell temperatures, a current state of charge for the battery pack 108 and/or any cell of the battery pack 108, a charging duration, a charging current and/or voltage, etc. The computer system 600 is not so limited, as other modules may be included depending on the desired functionality of the vehicle 100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, the module(s) can be configured via software, hardware, and/or firmware to stop charging and/or otherwise isolate one or more cells of a battery pack of the vehicle 100.

The processing device 602 can also be configured to communicate with one or more external devices 616 such as, for example, a keyboard, a pointing device, and/or any devices (e.g., a network card, a modem, vehicle ECUs, etc.) that enable the processing device 602 to communicate with one or more other computing devices. Communication with various devices can occur via Input/Output (I/O) interfaces 618 and 620.

The processing device 602 may also communicate with one or more networks 622 such as a local area network (LAN), a general wide area network (WAN), a bus network and/or a public network (e.g., the Internet) via a network adapter 624. In some embodiments, the network adapter 624 is or includes an optical network adaptor for communication over an optical network. It should be understood that although not shown, other hardware and/or software components may be used in conjunction with the computer system 600. Examples include, but are not limited to, microcode, device drivers, redundant processing units, external disk drive arrays, RAID systems, and data archival storage systems, etc.

Figure 7:
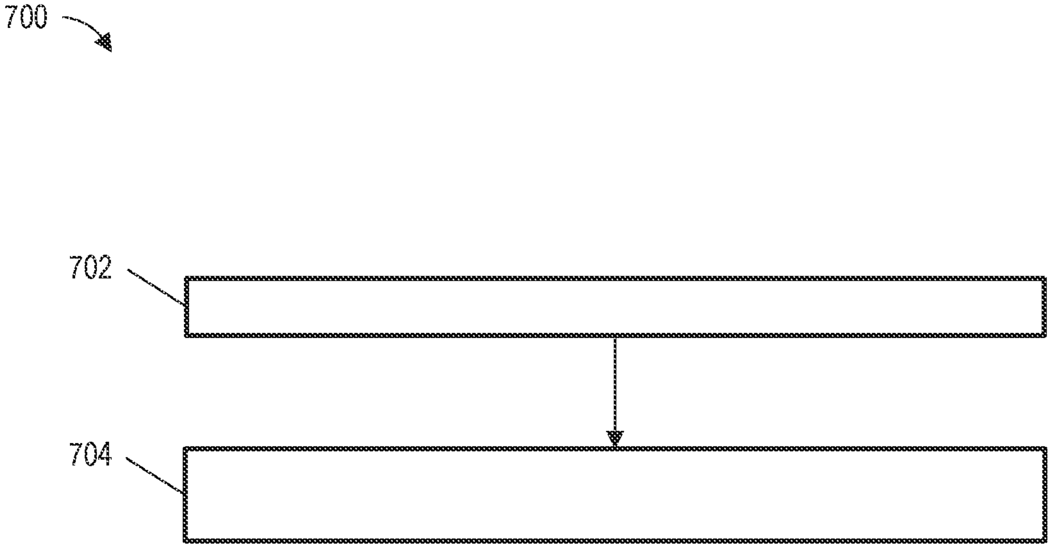
FIG. 7 is a flowchart in accordance with one or more embodiments.

Referring now to FIG. 7, a flowchart 700 for providing a battery pack that leverages mixed chemistry cells for maximal volume utilization is generally shown according to an embodiment. The flowchart 700 is described in reference to FIGS. 1 to 6 and may include additional steps not depicted in FIG. 7. Although depicted in a particular order, the blocks depicted in FIG. 7 can be rearranged, subdivided, and/or combined.

At block 702, a plurality of first battery cells of a first cell chemistry are provided. In some embodiments, each one of the plurality of first battery cells is made of a same first height, a same first width, and a same first length. In some embodiments, each one of the plurality of first battery cells is an NCM cell.

At block 704, a plurality of second battery cells of a second cell chemistry different than the first cell chemistry are provided. In some embodiments, the second cell chemistry provides a lower capacity than the first cell chemistry. In some embodiments, each one of the plurality of second battery cells is made of the same first height, the same first width, and a same second length. In some embodiments, the second length is greater than the first length. In some embodiments, each one of the plurality of second battery cells is an LFP cell.

In some embodiments, a first number of first battery cells and a second number of second battery cells are selected to maximize a volume utilization of the battery pack. In some embodiments, the plurality of first battery cells and the plurality of second battery cells are staggered in the battery pack in a brick style arrangement. In some embodiments, at least one cell of the plurality of second battery cells is between each pair of the plurality of first battery cells. In some embodiments, each line of the battery pack includes at least one cell of the plurality of first battery cells.

The terms “a” and “an” do not denote a limitation of quantity, but rather denote the presence of at least one of the referenced item. The term “or” means “and/or” unless clearly indicated otherwise by context. Reference throughout the specification to “an aspect”, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being “on” another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery pack comprising:

a plurality of first battery cells comprising a first cell chemistry, each one of the plurality of first battery cells comprising a same first height, a same first width, and a same first length; and a plurality of second battery cells comprising a second cell chemistry different than the first cell chemistry, the second cell chemistry providing a lower energy density than the first cell chemistry, each one of the plurality of second battery cells comprising the same first height as the first battery cells, the same first width as the first battery cells, and a same second length, the second length greater than the first length;

characterized in that the first length and the second length are selected such that each cell of the first battery cells and the second battery cells has a same cell capacity;

wherein the plurality of first battery cells and plurality of second battery cells are arranged in the battery pack into cell groups comprising a single cell of the plurality of first battery cells and two or more cells of the plurality of second battery cells; and wherein the cell groups are arranged in the battery pack in a brick configuration comprising two or more rows arranged such that cells in adjacent rows of the brick configuration are staggered.

2. The battery pack of claim 1, wherein each one of the plurality of first battery cells comprises a nickel-cobalt-manganese (NCM) cell.

3. The battery pack of claim 1, wherein each one of the plurality of second battery cells comprises a lithium-iron-phosphate (LFP) cell.

4. The battery pack of claim 1, wherein a first number of first battery cells and a second number of second battery cells are selected to maximize a volume utilization of the battery pack.

5. The battery pack of claim 1, wherein at least one cell of the plurality of second battery cells is between each pair of the plurality of first battery cells.

6. The battery pack of claim 1, wherein each line of the battery pack comprises at least one cell of the plurality of first battery cells.

7. The battery pack of claim 1, wherein the respective single cell of the plurality of first battery cells in each cell group is surrounded by cells of the plurality of second battery cells.

8. A vehicle comprising:

an electric motor; and a battery pack electrically coupled to the electric motor, the battery pack comprising:

a plurality of first battery cells comprising a first cell chemistry, each one of the plurality of first battery cells comprising a same first height, a same first width, and a same first length; and a plurality of second battery cells comprising a second cell chemistry different than the first cell chemistry, the second cell chemistry providing a lower energy density than the first cell chemistry, each one of the plurality of second battery cells comprising the same first height as the first battery cells, the same first width as the first battery cells, and a same second length, the second length greater than the first length;

characterized in that the first length and the second length are selected such that each cell of the first battery cells and the second battery cells has a same cell capacity;

wherein the plurality of first battery cells and plurality of second battery cells are arranged in the battery pack into cell groups comprising a single cell of the plurality of first battery cells and two or more cells of the plurality of second battery cells; and wherein the cell groups are arranged in the battery pack in a brick configuration comprising two or more rows arranged such that cells in adjacent rows of the brick configuration are staggered.

9. The vehicle of claim 8, wherein each one of the plurality of first battery cells comprises a nickel-cobalt-manganese (NCM) cell.

10. The vehicle of claim 8, wherein each one of the plurality of second battery cells comprises a lithium-iron-phosphate (LFP) cell.

11. The vehicle of claim 8, wherein a first number of first battery cells and a second number of second battery cells are selected to maximize a volume utilization of the battery pack.

12. The vehicle of claim 8, wherein at least one cell of the plurality of second battery cells is between each pair of the plurality of first battery cells.

13. The vehicle of claim 8, wherein each line of the battery pack comprises at least one cell of the plurality of first battery cells.

14. The vehicle of claim 8, wherein the respective single cell of the plurality of first battery cells in each cell group is surrounded by cells of the plurality of second battery cells.

15. A method for providing a battery pack that leverages mixed chemistry cells for maximal volume utilization, the method comprising:

providing a plurality of first battery cells comprising a first cell chemistry, each one of the plurality of first battery cells comprising a same first height, a same first width, and a same first length; and providing a plurality of second battery cells comprising a second cell chemistry different than the first cell chemistry, the second cell chemistry providing a lower energy density than the first cell chemistry, each one of the plurality of second battery cells comprising the same first height as the first battery cells, the same first width as the first battery cells, and a same second length, the second length greater than the first length;

characterized in that the first length and the second length are selected such that each cell of the first battery cells and the second battery cells has a same cell capacity;

wherein the plurality of first battery cells and plurality of second battery cells are arranged in the battery pack into cell groups comprising a single cell of the plurality of first battery cells and two or more cells of the plurality of second battery cells; and wherein the cell groups are arranged in the battery pack in a brick configuration comprising two or more rows arranged such that cells in adjacent rows of the brick configuration are staggered.

16. The method of claim 15, wherein each one of the plurality of first battery cells comprises a nickel-cobalt-manganese (NCM) cell.

17. The method of claim 15, wherein each one of the plurality of second battery cells comprises a lithium-iron-phosphate (LFP) cell.

18. The method of claim 15, wherein a first number of first battery cells and a second number of second battery cells are selected to maximize a volume utilization of the battery pack.

19. The method of claim 15, wherein at least one cell of the plurality of second battery cells is between each pair of the plurality of first battery cells.

20. The method of claim 15, wherein the respective single cell of the plurality of first battery cells in each cell group is surrounded by cells of the plurality of second battery cells.

* * * * *